US010377087B2

United States Patent
Kögl (10) Patent No.: US 10,377,087 B2
(45) Date of Patent: Aug. 13, 2019

(54) METHOD AND SYSTEM FOR INSERTING AN INSERT ELEMENT INTO A PANEL PRODUCT, THE PANEL PRODUCT PRODUCED THEREBY AND METHOD AND SYSTEM FOR PERFORMING A TENSILE TEST ON THE INSERTED INSERT ELEMENT

(71) Applicants: RUAG SCHWEIZ AG, Zürich (CH); Stefan Kögl

(72) Inventor: Stefan Kögl, Dielsdorf (CH)

(73) Assignee: RAUG SCHWEIZ AG, Zürich (CH)

( * ) Notice: Subject to any disclaimer, the term of this patent is extended or adjusted under 35 U.S.C. 154(b) by 393 days.

(21) Appl. No.: 14/436,848

(22) PCT Filed: Oct. 17, 2012

(86) PCT No.: PCT/EP2012/070549
§ 371 (c)(1),
(2) Date: Apr. 17, 2015

(87) PCT Pub. No.: WO2014/060027
PCT Pub. Date: Apr. 24, 2014

(65) Prior Publication Data
US 2016/0001501 A1 Jan. 7, 2016

(51) Int. Cl.
*B64C 1/06* (2006.01)
*F16B 5/01* (2006.01)
(Continued)

(52) U.S. Cl.
CPC ............ *B29C 65/48* (2013.01); *F16B 13/141* (2013.01); *B29C 65/542* (2013.01);
(Continued)

(58) Field of Classification Search
CPC .... F16B 5/01; F16B 13/141; B29C 66/72525; B29C 66/7254; B29C 65/48; B29C 65/542; B32B 37/12; B32B 37/142
See application file for complete search history.

(56) References Cited

U.S. PATENT DOCUMENTS

| | | | | | |
|---|---|---|---|---|---|
| 3,339,609 | A | * | 9/1967 | Cushman | B64C 1/12 249/93 |
| 5,240,543 | A | * | 8/1993 | Fetterhoff | F16B 5/01 156/293 |

(Continued)

FOREIGN PATENT DOCUMENTS

| DE | 3528869 A1 | 2/1987 |
|---|---|---|
| DE | 19829478 A1 | 3/1999 |

(Continued)

OTHER PUBLICATIONS

International Search Report for PCT/EP2012/070549 dated Oct. 16, 2013.

*Primary Examiner* — Carson Gross
(74) *Attorney, Agent, or Firm* — McCormick, Paulding & Huber LLP (57) ABSTRACT

In a method and a system for producing a panel product device, in which a panel pre-product is provided, comprising at least one recess formed in a panel surface and having a delimitation, and at least one insert element is provided, intended for anchoring in at least one of the recesses, the system comprises automated means for inserting the insert element into the recess in the panel pre-product, and automated means for filling an intermediate space between the insert element and the delimitation of the recess with a curable or curing filling fluid. In a method and a system for testing the loading resistance of the connection between the insert element and the recess in the panel surface of the panel pre-product, a variable tensile testing force is applied in an (Continued)

automated manner to the insert element up to a predetermined tensile testing force. Finally, a set of auxiliary assembly tools for use in the production method or system is provided, comprising a covering and positioning device for inserting and positioning the insert element in the recess and a connecting device for releasably connecting the insert element to the covering and positioning device.

21 Claims, 5 Drawing Sheets (51) Int. Cl.
B29C 65/00 (2006.01)
B29C 65/48 (2006.01)
B29C 65/54 (2006.01)
B32B 37/12 (2006.01)
B32B 37/14 (2006.01)
F16B 11/00 (2006.01)
F16B 13/14 (2006.01)

(52) U.S. Cl.
CPC .... *B29C 66/7254* (2013.01); *B29C 66/72525* (2013.01); *B32B 37/12* (2013.01); *B32B 37/142* (2013.01); *B64C 1/066* (2013.01); *F16B 5/01* (2013.01); *F16B 11/006* (2013.01)

(56) References Cited

U.S. PATENT DOCUMENTS

| 6,041,660 A | * | 3/2000 | Fujitaka | G01L 5/0033 |
| | | | | 73/826 |
| 2009/0326702 A1 | * | 12/2009 | Kuntz | G01M 7/025 |
| | | | | 700/110 |

FOREIGN PATENT DOCUMENTS

| DE | 10233259 A1 | 2/2004 | | |
| DE | 102007021341 A1 | 11/2008 | | |
| EP | 2172318 A1 * | 4/2010 | | B27F 4/00 |
| JP | H04-231711 A | 8/1992 | | |
| JP | H11-72424 A | 3/1999 | | |
| JP | 2006-273039 A | 10/2006 | | |
| JP | 2007-046929 A | 2/2007 | | |
| WO | 2010040499 A1 | 4/2010 | | |

* cited by examiner

Fig. 12

METHOD AND SYSTEM FOR INSERTING AN INSERT ELEMENT INTO A PANEL PRODUCT, THE PANEL PRODUCT PRODUCED THEREBY AND METHOD AND SYSTEM FOR PERFORMING A TENSILE TEST ON THE INSERTED INSERT ELEMENT

CROSS REFERENCE TO RELATED APPLICATIONS

This application is entitled to the benefit of and incorporates by reference essential subject matter disclosed in International Patent Application No. PCT/EP2012/070549 filed Oct. 17, 2012.

BACKGROUND

The present invention relates to a method and a system for inserting an insert element into a panel product, a panel product or panel product device produced using the method or the system, and an aircraft or spacecraft in which the panel product is installed.

SUMMARY

The relevant panel products are typically produced in light construction. In this case, a base material of the panel product comprises, in a first embodiment, a plurality of framework elements in an arrangement spaced apart as far as possible from one another or, in a second embodiment, a plurality of honeycomb cores having honeycomb core walls, wherein the honeycomb cores are generally implemented as hexagonal in a cross section parallel to a surface of the base material and the honeycomb core walls are implemented essentially perpendicularly to the surface and a cover layer resting on the honeycomb core walls is provided in each case at or below the surfaces on both sides. As much free space as possible remains between the framework elements or the honeycomb core walls and a large-volume panel product which comprises the free space is spanned by the framework elements or the honeycomb core walls. The arrangement of the framework elements or the honeycomb core walls ensures sufficient stiffness of the panel product and is optimized to maximize the free space and the volume of the panel product, ensure a required stiffness, and minimize the weight of the panel product.

In order that, in one application of such a panel product, another component or other assemblies can be fastened on the panel product, for example, without damaging the framework elements in the first embodiment or to anchor the assembly to be fastened securely with the cover layers in the second embodiment, insert elements are provided for insertion into respective depressions in the panel surface and are commercially available. The insert elements are embodied so that a fastening part for fastening the component or the assembly can engage on the panel product thereon or therein, similarly to an anchor in a wall, in which a screw can engage as a fastening part. The fastening part can be, for example, a screw or a hook. The insert elements have heretofore been manually inserted into the depressions and embedded in foam therein for the permanent anchoring. This procedure is intensive in work, time, and costs, and as a result can only be repeated to a limited extent in the scope of typical reproducibility of a manually executed process, and is subject to a risk that a load-bearing capacity of an anchor of the insert element in the panel product does not achieve a predetermined load-bearing capacity. If an insert element is inserted with insufficient load-bearing capacity, it must be removed, the recess must be excavated again, and a new insert element must be manually inserted into the excavated recess and embedded in foam. In an unfavorable case, a panel product will become unusable due to an insert element inserted with insufficient load-bearing capacity.

SUMMARY OF THE INVENTION

It is an object of the invention to provide a method and a system which remedy or reduce the disadvantages of the known method.

The object of the invention is therefore, in light construction technology, to provide a method and a system for producing a panel product device and for inserting an insert element into a (depression in the) surface of the panel product device, an installation aid toolkit having a cover and positioning unit and a connecting unit for connecting the cover and positioning unit to the insert element (all for use in the above-mentioned method or system), and a method and a system for checking the load-bearing capacity of the connection between the insert element and the (depression in the) surface of the panel product, which enable an insert element to be anchored to or in the panel surface reproducibly in a reliable, load-bearing manner, and with guaranteed load-bearing capacity, in accordance with light construction.

In addition, it is an object of the invention, using the method or system according to the object, to enable the production of panel product devices in mass production and thus enable cost-effective employment or use in an aircraft or spacecraft.

This object is achieved according to the invention for the method or the system for producing the panel product device by the features of Claim 1 or 14, respectively, for the cover and positioning unit by the features of Claim 36, for the installation aid tool kit by the features of Claim 45, for the system or the method for checking the load-bearing capacity by the features of Claim 52 or 59, respectively, for the system for checking the load-bearing capacity by the features of Claim 52, and for the panel product device or the possible uses thereof by the features of Claims 64 or 68 and 69, respectively.

Advantageous refinements of the claimed system, devices, and methods are defined by the corresponding dependent claims.

As claimed, according to a first aspect of the invention, a method is provided for producing a panel product device, wherein a panel precursor product having at least one recess, which is implemented in a panel surface, having a delimitation and having at least one insert element provided for anchoring in one of the recesses is provided. According to the invention, the method comprises the following steps: automated insertion of the insert element into the recess of the panel precursor product and automated filling of an intermediate space between the insert element and the delimitation of the recess with a curable or curing filling fluid. The filling of the intermediate space with the curable filling fluid causes reliable anchoring of the insert element in the recess of the panel precursor product. The automated insertion and filling enables the method to be executed reproducibly and with predefined quality with respect to the load-bearing capacity of the insert element to be anchored.

The panel precursor product can be produced in light construction. The panel product device produced by the method can be installed or used in an aircraft or spacecraft.

The method can comprise the curing or allowing to cure of the filling fluid decanted into the intermediate space. Solidly seated and permanent anchoring of the insert element in the recess of the panel precursor product is achieved by the curing of the filling fluid.

The filling fluid can be a foam-like or adhesive-like viscous fluid. Furthermore, the filling fluid can be curable by irradiation with electromagnetic radiation, for example, light or UV radiation, by a thermal process having method-dependent controllable temperature increase, or in the scope of a maintenance process with a predetermined waiting or curing time. In particular if a foam-like fluid is used, the method is particularly suitable for use in light construction technology.

The step of filling the intermediate space can comprise the provision of the filling fluid in a method-dependent controllable quantity during the filling. By suitable selection of the quantity, only a sufficient amount of filling fluid is consumed as is required for filling the intermediate space and not more. Material (filling fluid) and costs are thus saved.

The step of providing the filling fluid in the method-dependent controllable quantity can also comprise the following: sealing off the intermediate space and providing a decanting opening for filling the intermediate space with the filling fluid and an outlet opening for discharging excess filling fluid from the intermediate space, and filling the intermediate space with the filling fluid through the decanting opening until the intermediate space is essentially completely filled with the filling fluid. The reliability of the anchoring of the insert element in the panel precursor product is thus increased.

In the step of filling the intermediate space, the filling of the intermediate space can be ended when filling fluid exits through the outlet opening out of the intermediate space. In this case, the step of filling the intermediate space can comprise monitoring the outlet opening by means of a sensor unit, wherein the sensor unit can be implemented to output a signal when filling fluid exits through the outlet opening. In this case, the filling of the intermediate space with the fluid can be ended as a result of the output of the signal from the sensor unit. Material (filling fluid) and costs can thus also be saved.

Alternatively, the step of filling the intermediate space can comprise ending the filling of the intermediate space when a predetermined quantity of the filling fluid has been decanted through the decanting opening. In this case, the step of ending the filling of the intermediate space can also comprise the control of the decanting of the predetermined quantity of the filling fluid by monitoring a decanting duration or by monitoring a mass or weight increase of the panel product due to the decanted filling fluid. Material (filling fluid) and costs can thus also be saved.

The insert element can be detachably connected to a positioning and sealing and positioning unit before the insertion into the recess. The positioning and sealing and positioning unit can comprise a lower side, the decanting opening extending through the unit, and the outlet opening extending through the unit, and the insert element can be detachably fastened on the lower side of the unit. This enables precise positioning of the insert element in the recess and sealing off of the intermediate space or the recess in relation to the filling fluid to be decanted into the intermediate space.

After the curing of the filling fluid decanted into the intermediate space, it can be checked automatically whether a predetermined load-bearing capacity of the insert element anchored in the panel precursor product has been achieved. In this case, to check the load-bearing capacity, a testing tensile force can be applied to the insert element, wherein the testing tensile force can be oriented essentially perpendicularly to the panel surface and away from the panel surface, a predetermined testing tensile force can be associated with the predetermined connection strength, and the testing tensile force can be increased during the application at least up to the predetermined testing tensile force. The automated checking of the load-bearing capacity enables a uniformly high quality and reliability of the produced panel product device to be ensured.

As is also claimed, according to a second aspect of the invention, a system for producing a panel product device is provided, wherein a panel precursor product having at least one recess, which is implemented in a panel surface, having a delimitation and at least one insert element provided for anchoring in at least one of the recesses is provided. The system comprises means for automated insertion of the insert element into the recess of the panel precursor product and means for automated filling of an intermediate space between the insert element and the delimitation of the recess with a curable or curing filling fluid. The filling of the intermediate space with the curable filling fluid causes reliable anchoring of the insert element in the recess of the panel precursor product. By means of the system for automatic insertion and filling, the method can be executed reproducibly and with predefined quality with respect to the load-bearing capacity of the insert element to be anchored and panel product devices having predefined load-bearing capacity quality of the insert elements can be produced in mass production.

The system can furthermore comprise means for curing or allowing to cure the filling fluid decanted into the intermediate space. Solidly seated and permanent anchoring of the insert element in the recess of the panel precursor product is achieved by the curing of the filling fluid.

The automated filling means can comprise a sealing and positioning unit having a decanting opening for decanting the filling fluid into the intermediate space and an outlet opening for discharging excess filling means from the intermediate space. The sealing and positioning unit can be implemented so that it can be placed on the panel surface using a gripping unit. The sealing and positioning unit can comprise a lower side, the decanting opening extending through the sealing and positioning unit, and the outlet opening extending through the sealing and positioning unit. The sealing and positioning unit can also comprise a lower side and can be implemented so that the insert element can be detachably fastened on the lower side. This enables precise positioning of the insert element in the recess and sealing off of the intermediate space or the recess in relation to the filling fluid to be decanted into the intermediate space.

The decanting opening can be implemented in the sealing and positioning unit at a decanting position, which is selected so that the decanting opening is in fluid communication with a first partial spatial region of the intermediate space when the sealing and positioning unit rests on the panel surface. In this case, the outlet opening in the sealing and positioning unit can be implemented at an outlet position, which is selected so that the outlet opening is in fluid communication with a second partial spatial region of the intermediate space when the sealing and positioning unit rests on the panel surface. In this case, the second partial spatial region can also be in fluid communication with the first partial spatial region using fluid paths through the intermediate space, wherein the fluid paths essentially reach all partial spatial regions of the intermediate space which are complementary to the first and second partial spatial regions. Substantially complete filling of the intermediate space with the filling fluid is reliably achieved by such an arrangement of the decanting and outlet openings.

The sealing and positioning unit can comprise a middle section, on the lower side of which the insert element can be detachably fastened, and an edge section enclosing the middle section, in which the decanting opening and the outlet opening are implemented. In this case, the middle section of the sealing and positioning unit can be arranged between the decanting opening and the outlet opening. This implementation of the sealing and positioning unit with the decanting and outlet openings also contributes to the reliable and substantially complete filling of the intermediate space with the filling fluid.

The sealing and positioning unit can be implemented so that, when it rests on the panel surface, a seal which is fluid-tight with respect to the filling fluid is implemented between the panel surface and the sealing and positioning unit. The exit of filling fluid from the intermediate space is thus prevented during the filling. A barrier or a counter pressure with respect to the exit of decanted filling fluid is thus also provided, so that the filling fluid can fill up the intermediate space essentially completely.

The middle section can protrude with respect to the edge section by a predetermined projection height from the lower side of the sealing and positioning unit. In this case, the projection height can be selected so that when the lower side of the edge section rests on the panel surface, the insert element fastened on the lower side of the middle section is positioned in the desired predetermined position in the recess. The projection height of the middle section has the result that the insert element reliably does not protrude with its upper side out of the recess beyond the panel surface or the plane defined thereby.

A preferably weakly adhering adhesive film can be applied to the lower side of the sealing and positioning unit, in particular in the edge section of the sealing and positioning unit. The adhesive film has the result that the sealing and positioning unit does not slip on the panel surface in its state placed on the panel surface or during the filling of the intermediate space with the filling fluid.

The cover and positioning unit can be produced from a transparent material, for example, C-PET or PMMA. The procedure of decanting the filling fluid into the intermediate space can thus be optically or visually observed through the unit if needed.

The system can also comprise a connecting unit for detachably connecting the sealing and positioning unit to the insert element. The connecting unit can be actuable to connect the sealing and positioning unit to and to detach the sealing and positioning unit from the insert element. The connecting unit can have a grip section, which can be implemented so that it can be detachably gripped by a connection gripping unit. These embodiments contribute to making a method implemented using the system relatively easily automatable, and to allowing the insert element to be positioned precisely in position in the recess with good reproducibility during the insertion into the recess.

The sealing and positioning unit can have an opening having a circumferential or sectionally circumferential barb, for example, close to the surface, and can be implemented for automatically guiding through the connecting unit. The connecting unit can be implemented as a special screw. The special screw can have a screw collar, which, when the screw is guided through the opening, interacts with the barb or barbs so that the collar slides past the barb when it is guided through and engages with the barb when the screw is drawn back.

The connecting unit (for example, the special screw) can have one or more markings on a unit head (for example, a screw head). In particular, a central marking can be provided on an upper side of a screw head and/or one or more markings, which are applied on a circle on the screw head and can be differentiated from one another, can be provided. The central marking can be used, for example, if optical imaging units are used, for position determination of the connecting unit or a composite element, which comprises the connecting unit, the cover and positioning unit, and the insert element. The one or more markings, which are applied on the circle on the screw head and can be differentiated from one another, can be used, for example, if optical imaging units are used, for determining the rotational angle orientation of the connecting unit or the composite element.

The sealing and positioning unit can have one or more circumferential markings, which are arranged on its circumference, for example, in the form of indentations, for example. The circumferential markings can be used to move the sealing and positioning unit into a predetermined, reproducible rotational position in relation to the insert element to be connected to the sealing and positioning unit. The rotational position can be selected so that the decanting opening and the outlet opening in the sealing and positioning unit are arranged positioned aligned with corresponding decanting and outlet through holes of the insert element.

A surface of the insert element can be larger than the middle section of the sealing and positioning unit and can partially or completely overlap its edge section when the insert element and the sealing and positioning unit are connected to one another. For this purpose, the insert element also has through holes implemented in its surface on its upper side, for example, the above-mentioned decanting and outlet through holes. In this case, it is to be ensured, when establishing the connection of the insert element to the sealing and positioning unit, that the decanting through hole and the outlet through hole in the upper side of the insert element are aligned with the decanting opening and the outlet opening in the sealing and positioning unit. The above-mentioned circumferential markings on the sealing and positioning unit can be used to bring about the alignment of the openings with the through holes more easily.

The insert element and the sealing and positioning unit can be implemented so that they are connectable to one another by means of a connecting unit having a standardized size and implement a composite element in the connected state. For example, if the connecting unit is implemented as a screw (special screw), the screw can have a screw thread having a standardized dimension, for example, M4, M5, or M6.

The decanting opening or the outlet opening in the sealing and positioning unit can be implemented as a decanting channel or as an outlet channel. The decanting channel can have a decanting channel extension, which extends up into the decanting through hole, i.e., to below the panel surface, when the sealing and positioning unit is placed on the panel surface. Correspondingly, the outlet channel can have an outlet channel extension, which extends up into the outlet through hole of the insert element, i.e., in the inserted state of the insert element down to below the panel surface, when the sealing and positioning unit is placed on the panel surface. The channel extensions can be used, when the sealing and positioning unit is lifted off of the panel surface after the decanting of the filling fluid into the intermediate space, so that a tear-off boundary of the filling fluid is within the through holes of the insert element and therefore below the panel surface and does not protrude beyond the panel surface.

The insert means can comprise the sealing and positioning unit, the connecting unit, and a first arm unit which comprises the connection gripping unit. In this case, the first arm unit can be implemented and activatable so that it can grasp, move, position in a predetermined position, and release a composite group, which is implemented from the sealing and positioning unit, the connecting unit, and the insert element detachably fastened on the connecting unit. In this case, the connection gripping unit can comprise the grip section and can be activatable via the first arm unit so that it can interact with the grip section of the connecting unit and in this manner can grasp, move, position, and release the composite element. These embodiments contribute to the method implemented using the system being easily automatable.

The system can comprise a second arm unit having an actuating unit for actuating the connecting unit. In this case, the actuating unit can be implemented so that it can interact with the connecting unit. In this case, the actuating unit can also be implemented and can be activatable via the second arm unit so that it can actuate the connecting unit to connect the sealing and positioning unit to and to detach the sealing and positioning unit from the insert element. These embodiments also contribute to the method implemented using the system being relatively easily automatable.

The filling means can furthermore comprise an activatable and positionable metering robot having a fluid storage container for storing a predetermined storage quantity of the curable filling fluid and an outlet opening for discharging filling fluid. The system can comprise a metering unit, which is activatable using a control signal, for starting and ending the discharge of the filling fluid from the metering robot. These embodiments also contribute to the method implemented using the system being easily automatable.

The metering unit can be implemented for opening and closing the outlet opening. The metering unit can also be a part of the metering robot. The outlet opening of the metering robot and the decanting opening of the sealing and positioning unit can be implemented so that they can be moved into detachable contact with one another, which is fluid-tight with respect to the filling fluid. Undesired exiting of the filling fluid and contamination thus caused in the environment of the decanting opening is thus avoided.

The filling means can furthermore comprise a third arm unit, which can be implemented and activatable so that it can move the metering robot and position it in a predetermined position. The third arm unit can be implemented so that it can move the outlet opening of the metering robot into fluid-tight contact with the decanting opening of the cover and positioning unit.

A sensor unit for monitoring the outlet opening can be provided in the sealing and positioning unit. In this case, the sensor unit can be implemented to output a signal when filling fluid passes through the outlet opening.

The sensor unit can be an imaging unit having its field of vision oriented on the outlet opening. Alternatively thereto, the sensor unit can implement a light barrier or can implement a light barrier unit, which has a light source and a light detector, wherein a region between the light source and the light detector is arranged inside the outlet opening. The signal to be output can be generated when the light barrier is interrupted.

A control signal input of the metering unit can be in electrical communication with the signal output by the sensor unit.

The system can furthermore comprise means for presetting a predetermined quantity of the filling fluid to be discharged from the outlet opening of the metering robot.

The presetting means can comprise means for measuring a decanting duration and/or means for monitoring a mass or weight increase of the panel product due to the decanted filling fluid.

The system can also comprise means for automatically checking a load-bearing capacity of the connection between the insert element and the recess. Such means can comprise a fourth arm unit having a second connection gripping unit for grasping the connecting unit. In this case, the second connection gripping unit can be implemented so that it can be detachably connected to the connecting unit, in particular to its grip section. In this case, the second connection gripping unit can be implemented and can be activatable via the fourth arm unit so that it can grasp and hold the connecting unit, in particular the grip section thereof, can apply a variable testing tensile force up to a predetermined testing tensile force to the connecting unit, in particular thus also to the insert element, and can release the connecting unit again. Furthermore, the testing tensile force applied to the insert element anchored in the depression, an identifier for the depression, and an identifier for the panel precursor product having the at least one depression can be logged. Furthermore, a testing tensile force time curve, which is recorded during the application of the variable testing tensile force to the insert element by the arm unit, can also be recorded.

According to a third aspect of the invention, a sealing and positioning unit having an upper side, a lower side, a middle section, and an edge section enclosing the middle section is provided. In this case, the sealing and positioning unit is suitable for use in a method or system for producing a panel product device, in which a panel precursor product is provided having at least one recess, which is implemented in a panel surface, having a delimitation and at least one insert element provided for anchoring in at least one of the recesses. In this case, the insert element is automatically inserted into the recess of the panel precursor product and an intermediate space between the insert element and the delimitation of the recess is automatically filled with a curable or curing filling fluid. According to the invention, the sealing and positioning unit has an opening arranged in the middle section, a decanting opening arranged in the edge section, and an outlet opening arranged in the edge section essentially diametrically opposite to the decanting opening in relation to the middle section, and the opening, the decanting opening, and the outlet opening extend through the sealing and positioning unit.

The decanting opening can be implemented on the upper side so that filling fluid can be automatically decanted on the upper side and can exit on the lower side, for example, into the intermediate space, when the sealing and positioning unit is placed on the panel surface above the recess, and the outlet opening is implemented so that filling fluid, for example, excess filling fluid, can exit from the intermediate space on the upper side, when sealing and positioning unit is placed on the panel surface above the recess, can pass from the lower side toward the upper side through the outlet opening.

On the lower side of the sealing and positioning unit, the middle section can protrude in relation to the edge section by a predetermined projection height, preferably approximately 0.01 to 0.05 mm, more preferably approximately 0.03 mm. The opening can have a circumferential or sectionally circumferential barb, for example, close to the upper side.

The sealing and positioning unit can have a first channel extension, which is implemented on the lower side around an outlet of the decanting opening, and a second channel extension, which is implemented on the lower side around an outlet of the outlet opening. The sealing and positioning unit can also have an adhesive film applied to its lower side. Furthermore, the sealing and positioning unit can have one or more circumferential markings arranged on its circumference, which are capable of bringing the sealing and positioning unit into a predetermined, reproducible rotational position in relation to an axis extending through the central opening. The circumferential markings can be implemented in the form of indentations.

The sealing and positioning unit can be produced from a transparent material, for example, C-PET or PMMA. Furthermore, it can have a sensor unit, which is attached on the upper side at the outlet of the outlet opening, and which is implemented to detect filling fluid passing through the outlet opening and which can be implemented, for example, as a light barrier unit.

According to a fourth aspect of the invention, an installation aid toolkit is provided for use in a method or system for producing a panel product device, in which a panel precursor product having at least one recess, which is implemented in a panel surface, having a delimitation and having at least one insert element provided for anchoring in one of the recesses is provided, wherein the insert element is automatically inserted into the recess of the panel precursor product and an intermediate space between the insert element and the delimitation of the recess is automatically filled with a curable or curing filling fluid. According to the invention, the installation aid toolkit comprises a sealing and positioning unit having an upper side, a lower side, a middle section, and an edge section enclosing the middle section, an opening arranged in the middle section, a decanting opening arranged in the edge section, and an outlet opening, which is arranged in the edge section substantially diametrically opposite to the decanting opening in relation to the middle section. In this case, the opening, the decanting opening, and the outlet opening extend through the sealing and positioning unit. Furthermore, the installation aid toolkit comprises a connecting unit for detachably connecting the sealing and positioning unit to the insert element.

The sealing and positioning unit can be implemented according to the third aspect of the invention.

The connecting unit can be actuable to connect the sealing and positioning unit to and to detach the sealing and positioning unit from the insert element. In particular, the connecting unit can have a grip section, which is implemented so that it can be detachably grasped by a connection gripping unit.

The sealing and positioning unit can comprise a circumferential or sectionally circumferential barb, for example, close to the upper side, in the opening and the connecting unit can be implemented as a special screw having a screw collar, which, when the special screw is guided through the opening, interacts with the barb or barbs so that the collar slides past the barb as it is guided through and an engagement with the barb occurs when the special screw is pulled back.

The connecting unit can be implemented as a special screw having a screw head, which has a central marking on an upper side. Alternatively and/or additionally thereto, the screw head can have one or more markings, which are applied on a circle on the screw head and can be differentiated from one another, on an upper side.

According to a fifth aspect of the invention, a system is provided for checking a load-bearing capacity of the connection between an insert element and a recess in a panel surface of a panel precursor product. In this case, the insert element is provided to be inserted into the recess and to be anchored in the recess by filling the intermediate space between the insert element and a delimitation of the recess with a curable or curing filling fluid. According to the invention, the system comprises at least one insert element, at least one connecting unit, which is actuable to produce a connection to and to detach the connection from the insert element, and means for automatically checking a load-bearing capacity of the connection between the connecting unit and the insert element.

The connecting unit can be implemented as a special screw having a screw head and a screw thread and the insert element can have a threaded borehole. In this case, the threaded borehole and the screw thread can fit together so that the screw thread can be screwed into the threaded borehole. The threaded borehole of the insert element can be implemented along an axis of symmetry of the insert element.

The connecting unit can have a grip section, which is implemented so that it can be detachably grasped by a connection gripping unit.

The means for automatically checking a load-bearing capacity can comprise the following: an arm unit having a connection gripping unit for gripping the connecting unit. In this case, the connection gripping unit can be implemented so that it can be detachably connected to the connecting unit, in particular to its grip section. In this case, the connection gripping unit can also be implemented and can be activatable via the arm unit so that it can grasp, hold, apply a variable testing tensile force up to a predetermined testing tensile force to the connecting unit, in particular thus also to the insert element, and release the connecting unit, in particular its grip section.

The means for automatically checking a load-bearing capacity can furthermore comprise means for logging the testing tensile force applied to an insert element anchored in a depression, an identifier for the depression, and an identifier for the panel precursor product having the at least one depression. It can furthermore comprise means for recording a testing tensile force time curve, which can be recorded during the application of the variable testing tensile force to the insert element by the arm unit.

According to a sixth aspect of the invention, a method is provided for checking a load-bearing capacity of the connection between an insert element and a recess in a panel surface of a panel precursor product. In this case, the insert element is provided to be inserted into the recess and to be anchored in the recess by filling the intermediate space between the insert element and a delimitation of the recess with a curable or curing filling fluid. According to the invention, the method comprises the following steps: automatically establishing a connection of a connecting unit to an insert element, which is anchored in a recess after the curing of the filling fluid, automatically grasping the connecting unit by means of an activatable connection gripping unit, which is attached to an activatable arm unit, and applying a variable testing tensile force up to a predetermined testing tensile force to the connecting unit, in particular thus also to the insert element.

Furthermore, the testing tensile force applied to the insert element anchored in the depression, an identifier for the depression, and an identifier for the panel precursor product having at least one depression can be logged.

Furthermore, a testing tensile force time curve, which is recorded during the application of the variable testing tensile force to the insert element by the arm unit, can be recorded.

Furthermore, the connection between the connecting unit and the insert element can be automatically detached. The connecting unit can also be automatically released by the connection gripping unit.

As is also claimed according to a seventh aspect of the invention, a panel product device is provided, which is produced from a panel precursor product having at least one recess, which is implemented in a panel surface, having a delimitation and an insert element, which can be anchored, for insertion into at least one of the recesses. The panel product device comprises the panel precursor product having the recess, which is implemented in a panel surface, and the insert element anchored in the recess. In this case, the recess has a delimitation in relation to a base material of the panel precursor product. According to the invention, an intermediate space between the insert element and the delimitation of the recess has been automatically and substantially completely filled with a cured filling fluid and the panel product device has a predetermined load-bearing capacity of the anchor of the insert element in the recess.

The panel product device can be provided for use in an aircraft and/or spacecraft or can be implemented accordingly.

The panel product device can have been produced using above-described methods.

The panel precursor product can comprise a light construction panel or can have been produced from a light construction panel.

Finally, an aircraft and/or spacecraft is also claimed, which comprises at least one above-described panel product device.

BRIEF DESCRIPTION OF THE DRAWINGS

Further properties and advantages of the invention will be described hereafter on the basis of a description of advantageous embodiments and with reference to the appended drawings. In the figures.

DETAILED DESCRIPTION

The principle of the present invention will firstly be described in the context of a first exemplary embodiment with reference to FIGS. 1 to 9.

In the first embodiment, a method and a system for producing a panel product device are provided. The method and the system require, as the starting point, a panel precursor product 11 having at least one recess 12, which is implemented in a panel surface 13, having a delimitation in relation to a base material 17 (see FIG. 6) and at least one insert element 20, which is provided to be inserted into the recess 12, and which is preassembled together with a cover and positioning unit 40 by means of a connecting unit 60 to form a composite element (see FIGS. 2 and 5). The method and system according to the invention for inserting insert elements 20 into recesses 12 of the panel precursor product 11 replace the previously practiced manual insertion and embedding in foam of insert elements 20 in the recesses 12.

Figure 6:
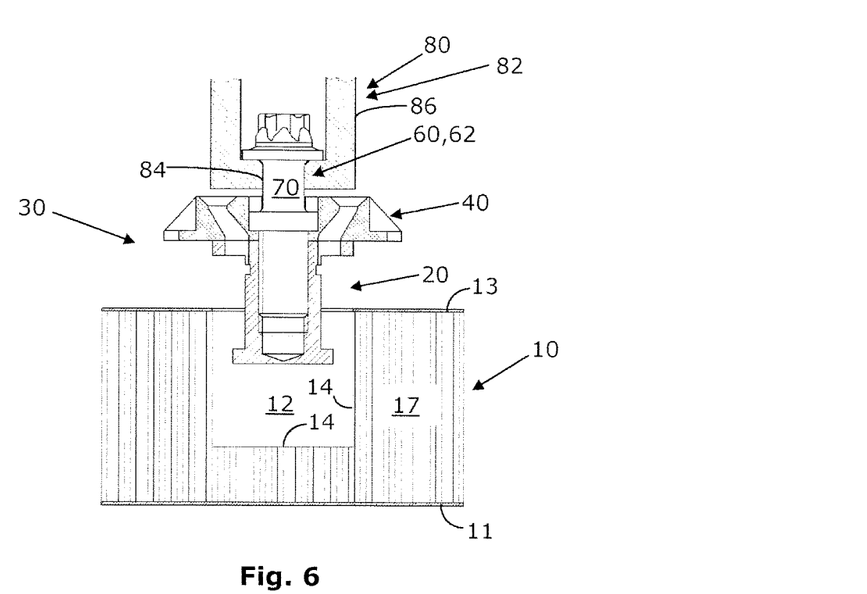
FIG. 6 shows a cross section through the parts shown in FIGS. 2 and 5, a first arm unit, and a panel precursor product during the insertion of the insert element into the recess.
Figure 7:
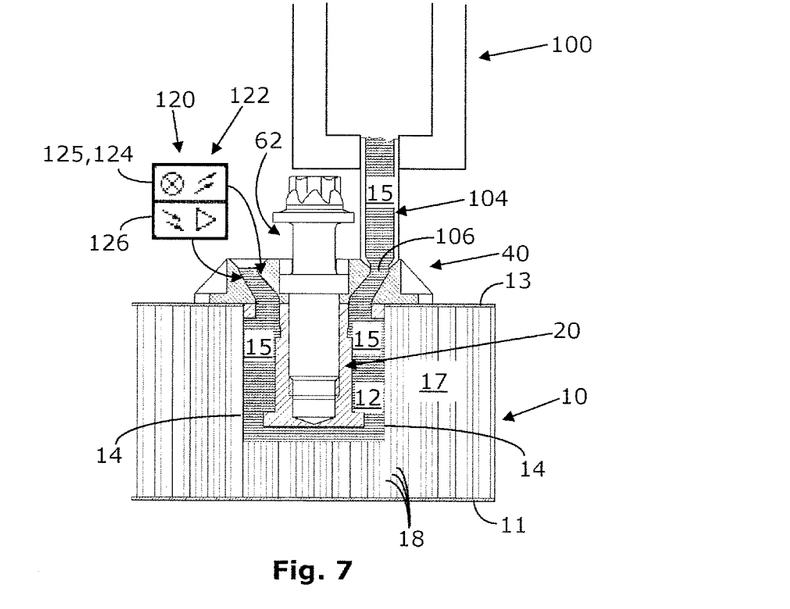
FIG. 7 shows a cross section through the parts shown in FIGS. 2 and 5 and a panel precursor product during the filling of the intermediate space between the insert element and the delimitation of the recess.

The system comprises means for automated insertion of the insert element 20 into the recess 12 of the panel precursor product 11 (see FIG. 6) and means for automated filling of an intermediate space 16 between the insert element 20 and the delimitation 14 of the recess 12 with a curable or curing filling fluid 15 (see FIG. 7).

The means for automated insertion comprise a sealing and positioning unit 40 (see FIGS. 1 and 4) having a decanting opening 43 for decanting the filling fluid 15 into the intermediate space 16 and having an outlet opening 44 for discharging excess filling means 15 from the intermediate space 16. The sealing and positioning unit 40 has a lower side 50, which is implemented so that the insert element 20 can be detachably fastened thereon (see FIGS. 2, 3, and 5). The sealing and positioning unit 40 is implemented so that, when it rests on the panel surface 13, a fluid-tight seal with respect to the filling fluid 15 is implemented between the panel surface 13 and the sealing and positioning unit 40 (as shown in FIG. 7 in particular).

Figure 8:
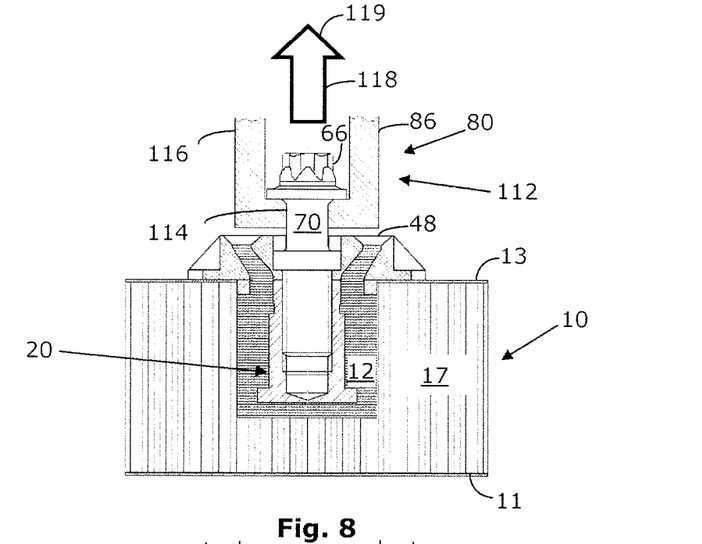
FIG. 8 shows a cross section through the parts shown in FIGS. 2 and 5, another arm unit, and a panel product during the application of a testing tensile force to the connecting unit and thus to the insert element.

The system furthermore comprises a connecting unit 60 for detachably connecting the sealing and positioning unit 40 to the insert element 20. The connecting unit 60 is actuable to connect the sealing and positioning unit 40 to, and to detach the sealing and positioning unit 40 from the insert element 20 (see FIG. 9). The connecting unit 60 has a grip section 70, which is implemented so that it can be detachably grasped by a connection gripping unit 110 (see FIG. 6). The connecting unit 60 is implemented as a special screw 62 (see FIGS. 2 and 5), which has an at least sectionally cylindrical grip section 71 (see FIG. 2), which is implemented so that it can be detachably grasped by a connection gripping unit 82 (FIG. 6) or 112 (FIG. 8).

The connection gripping unit 82 shown in FIG. 6 is associated with a first arm unit 80, for example, a first robot arm, having gripping fingers 86, which each have a gripping surface 84 in their gripping region. The gripping fingers 86 are mounted so they are pivotable about a pivot point (not shown), so that multiple gripping fingers can be pivoted toward one another like the fingers of a human hand for grasping and away from one another for releasing. The second connection gripping unit 112 shown in FIG. 8 has a functionally comparable structure as the unit 82 from FIG. 6 and comprises gripping fingers 116 having gripping surfaces 114 implemented on their end sections. The second connection gripping unit 112 is associated with a fourth arm unit 110, for example, a fourth robot arm. The first or fourth connection gripping unit 80 or 110 shown in FIG. 6 or 8, respectively, can be identical if it is variably programmable so that, on the one hand, it can execute the function illustrated in FIG. 6 of the insertion of the insert element 20 into the recess 12 and, on the other hand, can execute the load-bearing capacity test indicated in FIG. 8, during which a variable testing tensile force 118 is applied to the connecting unit 60 or the special screw 62 and thus also to the insert element 20.

In the first embodiment shown in FIGS. 1 to 9, the insertion means comprise the sealing and positioning unit 40, the connecting unit 60 (special screw 62), the first connection gripping unit 82, and the first arm unit 80 or the first robot arm.

The system furthermore comprises an actuating unit 92 for actuating the connecting unit 60 (for example, the special screw 62), and a second arm unit 90, for example, a second robot arm, for guiding the actuating unit 92. The actuating unit 92 comprises a tool 94, which is implemented so that it can interact with the connecting unit 60 (the screw 62) to connect the unit 40 to and to detach it from the insert element 20. The cover and positioning unit 40, the insert element 20, and the connecting unit 60 form a composite element in the (preassembled) state, in which they are connected to one another (see FIGS. 2, 3, and 5).

Figure 2:
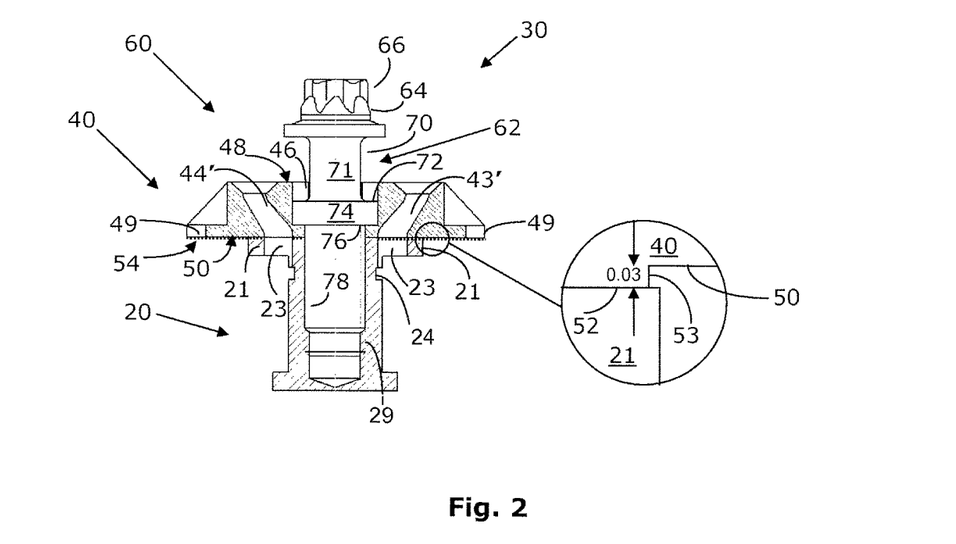
FIG. 2 shows a cross section of the cover and positioning unit from FIG. 1 having the insert element fastened thereon.

The special screw 62, as an embodiment of the connecting unit 60, comprises a screw head 64 having a hexalobular external 66 (see FIGS. 2, 3, and 5), an essentially cylindrical screw neck 71 extending downward from the screw head 64 in FIG. 2, a screw collar 74, which delimits the screw neck 71, having an upper stop surface 72 and a lower stop surface 76, and a screw thread 78 extending still further (downward in FIG. 2) from the lower stop surface 76 of the screw collar 74, which is a thread standardized for metal screws, for example, according to one of the standards M4, M5, and M6. The threaded borehole 29 in the insert element 20 is used for engaging with or for receiving the screw thread 78 and is also standardized, for example, according to one of the standards M4, M5, and M6. The tool 94 of the actuating unit 92 is implemented as a hexalobular external screwdriver 96, so that it can be placed easily and possibly automatically by an automatic screwing machine having gripping arm on the hexalobular external 66 of the screw head 64 and can also rotate the screw head 64 and therefore the entire special screw 62 as it rotates (see FIG. 9).

The means for automated filling of the intermediate space 16 comprise an activatable and positionable metering robot 102 having a fluid storage container 104 for storing a predetermined storage quantity of the filling fluid 15 and an outlet opening 106 for discharging filling fluid. Furthermore, a metering unit (not shown), which is activatable by means of a control signal, is provided in the system, for example, as part of the metering robot 102, for starting and ending the discharge of the filling fluid 15 from the outlet opening 106 of the metering robot 102. The filling means furthermore comprise a third arm unit 100, for example, a third robot arm, which is implemented and activatable so that the metering robot 102 can be grasped, moved, and positioned in a predetermined position. The third arm unit 100 is activatable so that the metering robot 102 can be guided and positioned exactly and reliably in a decanting position. In this case, the outlet opening 106 of the metering robot 102 comes into direct fluid communication with the decanting opening 43 of the cover and positioning unit 40. An outlet section, which is in the form of a truncated cone, of the metering robot 102 is implemented around the outlet opening 106, which can implement a fluid-tight form fit with respect to the filling fluid 15 with an application region of the inlet opening 43 (see FIG. 7).

The filling means furthermore comprise a sensor unit 120 for monitoring the outlet opening 44. The sensor unit is provided in or on the sealing and positioning unit 40 and is implemented as a light barrier unit 122. The latter comprises a light source 124, for example, an LED 125, which is arranged in or on the unit 40 laterally at or adjacent to the outlet opening 44, and a light sensor 126, which is also arranged laterally at the outlet opening 44 and diametrically opposite in relation to the light source 124 (see FIG. 7).

In operation of the system, filling fluid 15 is decanted from the storage container 104 through its outlet opening 106 and through the inlet opening 43 into the intermediate space 12, until the intermediate space 12 is substantially completely filled with the filling fluid 15 and the filling fluid 15 finally exits from the outlet opening 44 and activates the light barrier unit 122 at the same time. The light barrier unit 122 detects the exit of filling fluid 15 from the outlet opening 44 in that the optical connection between the light source 124 and the light sensor 126 is interrupted by the exiting filling fluid 15. When the light barrier is activated by the filling fluid 15 exiting from the opening 44, the sensor unit (light barrier unit 122) outputs a signal, which is supplied as a control signal to a control signal input of the metering unit (not shown).

The system for producing the panel product device 10 furthermore comprises a system for automatically checking a load-bearing capacity of the anchoring of the insert element 20 in the recess 12 or the panel precursor product 11. The automated load-bearing capacity checking system comprises a second connection gripping unit 112 for grasping the connecting unit 60 or specifically the special screw 62. The second connection gripping unit 112 comprises two or more gripping fingers 116, at the end section of each of which a gripping surface 114 is provided for engaging with the grip section 70 of the connecting unit 60, specifically with the screw neck 71 of the special screw 62. The automated checking means furthermore comprise a fourth arm unit 110, for example, a fourth robot arm, by means of which the second connection gripping unit 112 is activated so that the grip section 70 (specifically: the screw neck 71) can be grasped, held, and released. The fourth arm unit 110 is then activated so that a variable testing tensile force 118 (illustrated in FIG. 8 by the arrow 119) is applied to the connecting unit 60 (specifically: the special screw 62) and is increased up to a predetermined testing tensile force, which acts on the connecting unit 60 and thus on the insert element 20. The predetermined testing tensile force corresponds to a guaranteed load-bearing capacity or connection quality, which is to be specified for the panel product 10, of the insert element 20 anchored in the recess 12 (cf. FIG. 9). The predetermined testing tensile force is selected so that it is at least as high as a testing tensile force or tensile carrying capacity or load-bearing capacity to be guaranteed to a user of the panel product device 10 if desired. When the predetermined testing tensile force is reached in the tensile test in this case and the inserted, tested insert element 20 remains anchored in the recess 12, the tested insert element 20 fulfills the guaranteed tensile carrying capacity or load-bearing capacity. In a checking or testing log, which can be prepared automatically, at least one identifier for the tested insert element 20 or the tested depression 12, one identifier for the panel precursor product 11 having the at least one depression 12 having the inserted insert element 20, and the testing tensile force applied to the anchored insert element 20 are logged. A testing tensile force time curve, which is recorded during the application of the variable testing tensile force 118 to the insert element 20 by the arm unit 110, can also be recorded in the log. The log can be associated with an entire batch or with a single panel product 10, and it contains the logged data for all insert elements 20 which are inserted into the panel product 10 and tested. A process reliability for the automatic insertion (called "potting" in the technical jargon) of the insert elements can be documented by the tensile carrying capacity or load-bearing capacity test.

The insert element 20 is constructed as substantially rotationally-symmetrical and has a substantially cylindrical middle section (not shown), a base flange 27, which is implemented on a first end (below in FIG. 2), having a level base surface 26, and an upper flange 21, which is implemented on a second end, opposite to the first end (above in FIG. 2), of the middle section, having a level upper surface 22. In the insert element 20, proceeding from the upper flange 22, a center borehole 28, which extends in the direction of the axis of symmetry, is implemented, which extends through the middle section and is implemented at least sectionally as a threaded borehole 29, originating from the upper surface 22. In the upper flange 21, two diametrically opposing through holes 23 are implemented, see FIG. 2. In the essentially cylindrical middle section, which is arranged inside the recess 12 after the insertion of the insert element 20 into the recess 12 and is enclosed by the decanted filling fluid, of a commercially available insert element 20, a ring-shaped circumferential notch 24 is implemented in the vicinity of the upper flange 21. The notch 24 is used to or enables the middle section of the insert element 20 to be pinched diametrically inward more easily, and a fastening element screwed using its screw thread into the threaded borehole 29, for example, a fastening screw or a screw hook, is thus secured after the screwing in by the pinch in the insert element 20. Such securing of a screwed-in fastening element is relevant if the panel product 10 is used in a spacecraft which travels in weightlessness.

When, during a use of the panel precursor product 10, a fastening element screwed into the threaded borehole 29 of the insert element 20, for example, a fastening screw or a screw hook, has a hexalobular external, for example, when a fastening screw has a screw head having a hexalobular external, it is then relatively simple to apply a screwing tool automatically to the hexalobular external and to carry out a measurement of the torque, which is required to screw the fastening element with its screw thread into the threaded borehole 29 of the insert element 20 and into the middle section of the insert element 20, which is pinched at the notch 24. The dimension of the torque required for screwing the fastening element into the pinched middle section can be used as a measure of the quality of the pinch and the securing quality to be expected, during use of the panel product device 10 in weightlessness, of the fastening element screwed into the threaded borehole 29 of the insert element 20.

Figure 1:
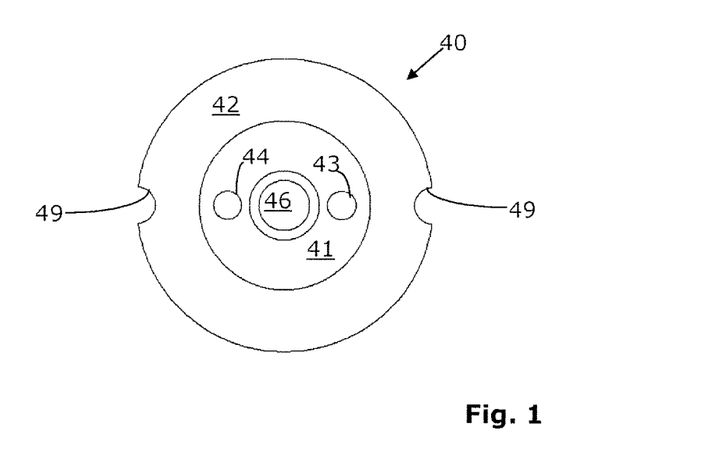
FIG. 1 shows a bottom view of a first embodiment of a cover and positioning unit according to the invention having an insert element fastened thereon by means of a connecting unit, for use in the method or system according to the invention.

The sealing and positioning unit 40 is a circular and essentially rotationally-symmetrical plate having a middle section 41, which is centered in relation to the axis of rotation of symmetry, and a ring-shaped edge section 42, which encloses the middle section 41. A through hole or an opening 46 is implemented centered in the middle section 41. The rotational symmetry of the plate 40 is interrupted by two diametrically opposite openings 43 and 44, which are implemented in the middle section 41, and between which the opening 46 is arranged, and by two diametrically opposing indentations 49, which are implemented in the edge of the edge section 42. The two indentations 49, the openings 43 and 44, and the through hole 46 are arranged on a line of symmetry which extends from left to right in each case in FIGS. 1, 3, and 4. FIG. 1 shows a view of the unit 40 from below, FIG. 4 shows a top view from above, FIG. 2 shows a cross section in section through the line of symmetry extending from left to right in FIG. 1, and FIG. 5 shows a cross section through the line of symmetry, which extends from top to bottom in FIGS. 1 and 4, of the sealing and positioning unit 40.

As can be seen best in FIG. 2, the openings 43 and 44 are implemented as channels 43' and 44'. Both channels 43' and 44' are implemented in the form of truncated cones at their upper end (cf. FIGS. 2 and 4) and extend from this recess in the direction toward the lower side 50 of the unit 40 (downward in FIG. 2) and inclined toward the axis of rotational symmetry. At the lower side 50 of the unit 40, the channels 43' and 44' open into openings. These openings are congruent or aligned with the through holes 20 in the upper flange 21 of the insert element 20 when the insert element 20 is applied (preassembled) in a matching rotational orientation on the unit 40 or, vice versa, the unit 40 is placed in the matching rotational orientation on the insert element 20, as can be seen best in FIG. 2.

Figure 3:
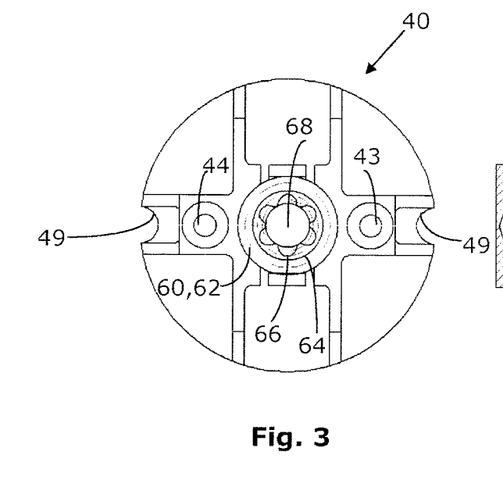
FIG. 3 shows a top view of the cover and positioning unit from FIG. 1 having a connecting unit, a special screw here.

The indentations 49 in the edge section 42 of the unit 40 are used so that a gripping unit can easily rotate the unit 40 about its axis of rotation of symmetry into the matching rotational orientation, in which the openings 43 and 44 on the lower side 50 of the unit 40 are aligned with the through holes 20 in the upper flange 21 of the insert element 20. The unit 40 is not necessarily implemented as solid between its upper side 48 and its lower side 50 in the regions outside the openings 43, 44, and 46, but rather can have reinforcement walls standing in parallel to the axis of rotational symmetry and perpendicularly in relation to the lower side 50, as can be seen in FIGS. 3 and 4 in a top view and in FIG. 5 in cross section.

Figure 4:
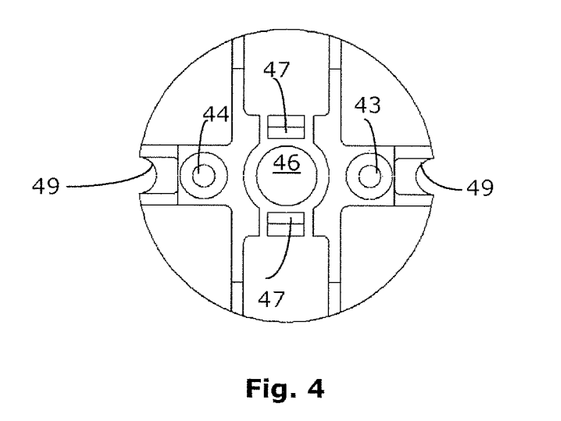
FIG. 4 shows a top view of the cover and positioning unit from FIG. 1 without the connecting unit, the special screw here.
Figure 5:
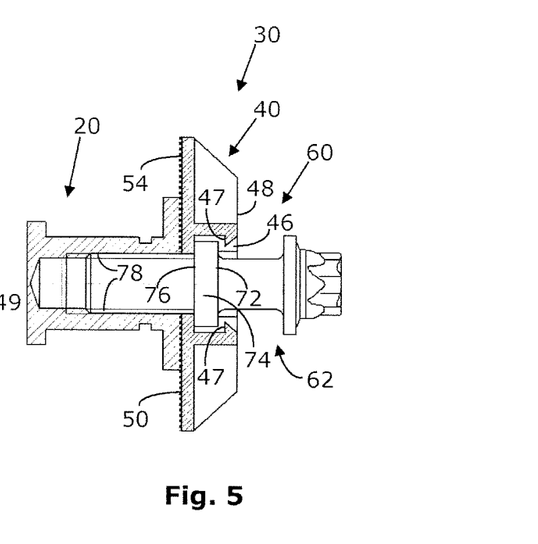
FIG. 5 shows another cross section through the parts shown in FIG. 2, in section through the vertical line of symmetry in FIG. 3.

Two barbs 47, which are diametrically opposite to one another and aligned pointing toward one another, are implemented laterally to the center opening 46, as can be seen best in the top view in FIG. 4 and in cross section in FIG. 5. The barbs 47 have a construction-related flexibility or elasticity, as a result of which they can be bent away from one another from the opening 46 in opposite directions and can exert an elastic force oriented toward the opening 46 at the same time.

On the lower side 50 of the unit 40, a projection 52, which points downward in FIG. 2, having a predetermined projection height 53 is implemented in the middle section, as can be seen best in the detail view of FIG. 2. The projection height 53 is preferably 0.03 mm. The projection 52 overlaps the openings of the channels 43' and 44' and is used so that when the unit 40 having the insert element 20 detachably connected thereon has been guided to the recess 12 (as shown in FIG. 6) and then lowered thereon, until the lower side 50 of the unit 40 rests on the panel surface 13 of the panel precursor product 11, the insert element 20 is exactly positioned in a desired anchoring position, in which the upper surface 22 of the upper flange 21 of the insert element is arranged below the panel surface 13 by the projection height 53 and in any case reliably does not protrude out of the recess 12 beyond the panel surface 13.

The special screw 62 can have a central marking 68 (see FIGS. 3 and 11) on an upper side of its screw head 64. The central marking 68 enables, using visual means (not shown), a visual verification of the geometrical position of the screw 62 in a completely or partially automated process and, when the screw 62 has preassembled the unit 40 with or connects it to the insert 20, also the geometrical position of the insert 20. The central marking 68 is, for example, a specially marked center point on a surface of the hexalobular external 66 of the screw head 64. On a perimeter or circle around the hexalobular external 66, one or more markings 69, which can be differentiated from one another, for example, numbers of the individual partial sections of the hexalobular external 66 (see FIG. 11) can be provided. The markings 69 are each recognizable in a top view (see FIG. 11) using optical means (not shown) and enable a visual verification of a rotational angle position of the screw 62 in a completely or partially automated process.

The depth of the borehole 28 and the threaded borehole 29 in the insert element 20, measured from the upper surface 22 of the insert element 20, are predetermined and adapted to the length of the screw thread 78 of the special screw 62 and the thickness of a lower wall (not shown) of the unit 40, more precisely the spacing from the lower side 50 of the unit 40 up to the stop surface in the opening 46 of the unit 40, when the screw thread 78 of the special screw 62 is inserted through the opening 46 of the unit 40 and screwed into the threaded borehole 29 of the insert 20, as can be seen in FIGS. 2 and 5.

Figure 11:
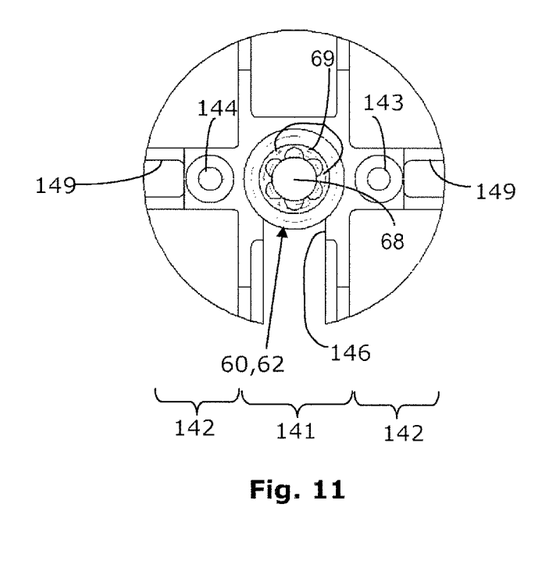
FIG. 11 shows a top view of the cover and positioning unit and the connecting unit from FIG. 10.

The cover and positioning unit 40, which is shown in FIGS. 1, 3, and 4, according to the first embodiment and the cover and positioning unit 40 shown in FIG. 11, consists of a transparent material, for example, C-PET or PMMA. The procedure of decanting the filling fluid 15 into the intermediate space 16 can be visually observed during the decanting if needed through the unit 40, 140, as can be seen in FIG. 7.

The two smaller, diametrically opposing openings 43 and 44 of the unit 40 (see FIG. 1), and the openings 143, 144 of the unit 140 (see FIG. 11) are used for decanting the filling fluid 15 into the intermediate space 16 between the insert element 20 and the delimitation 14 of the recess 12. Before the filling, the insert element 20 is introduced and centered in the preassembled state, i.e., in the connection to the unit 40 (see FIG. 7) or 140 mediated by the connecting element 60 (the special screw 62), into the recess 12, wherein the lower side 50 of the unit 40 rests on the panel surface 13. The outlet opening 106 of the storage container 104 of the metering robot 102 is then guided to the one opening 43 or 143 then used as the decanting opening. The filling fluid 15 is then decanted from the storage container 104 into the intermediate space 16, as indicated in FIG. 7. The other opening 44 or 144 of the unit 40 or 140 is used as the outlet opening 44 or 144, and does so from the moment when the viscous filling fluid 15 begins to exit from the outlet opening 44 or 144, after the intermediate space 16 has been essentially completely filled with the filling fluid 15. In this case, the viscosity of the filling fluid 15 to be decanted, the cross-sectional area of the outlet opening 106, the cross-sectional area of the decanting opening 43 or of the decanting channel 43', the cross-sectional area of the intermediate space 16 through which the filling fluid flows during the filling, the cross-sectional area of the outlet opening 44 or the outlet channel 44', and the decanting rate of the filling fluid 15, i.e., the quantity of filling fluid 15 introduced per unit of time, are adapted to one another to ensure rapid filling of the intermediate space 16 with the filling fluid 15.

After the filling fluid 15 has completely filled the intermediate space 16 during the filling, the filling fluid 15 exits through the outlet opening 44 or 144 and activates the light barrier unit 122 used as the sensor unit 120 at the same time. The light barrier unit 122 comprises, as already mentioned, a light source 124, for example, an LED 125, which is arranged laterally at the outlet channel 44' or 144', and a light sensor 126, which is arranged on the opposite side of the outlet channel 44', 144' in relation to the light source 124, as well as required electrical circuits for powering the light source 124, for reading out the light sensor 126, and for generating an output signal when the light barrier unit 122 is activated. The output signal of the light barrier unit 122 is supplied to a metering unit, which stops the outflow of the filling fluid 15 from the outlet opening 106 of the metering robot 102, for example, by closing the outlet opening 106.

The filling fluid 15 is a self-curing filling fluid or a curable filling fluid. The filling fluid 15 can be a foam which rapidly cures itself, alternatively, it can also be a self-curing or elastically curing adhesive. The function of the filling fluid 15 is, in the cured state, to anchor the insert element 20 fixedly, i.e., with a predetermined carrying capacity, in the recess 12. Depending on the selection of the material of the filling fluid 15, the curing can be accelerated thermally (for example, by heating), optically (for example, by irradiation of light, infrared radiation, or UV radiation), or by another form of supply of an activation energy required for the curing.

The curing time of the filling fluid 15 is generally predetermined according to producer specifications, in order to ensure complete curing of the decanted filling fluid 15 in the case of a self-curing filling fluid. In the case of a curable filling fluid, the curing time is also predefined according to producer specifications depending on the method according to the curing method to be executed. The tensile test described above with reference to FIG. 8 is, in any case, only executed after complete curing of the filling fluid 15 decanted into the recess. To maintain the curing time predefined by a producer of the filling fluid 15, a corresponding time controller can be provided, which displays or communicates the end of the curing operation.

Figure 9:
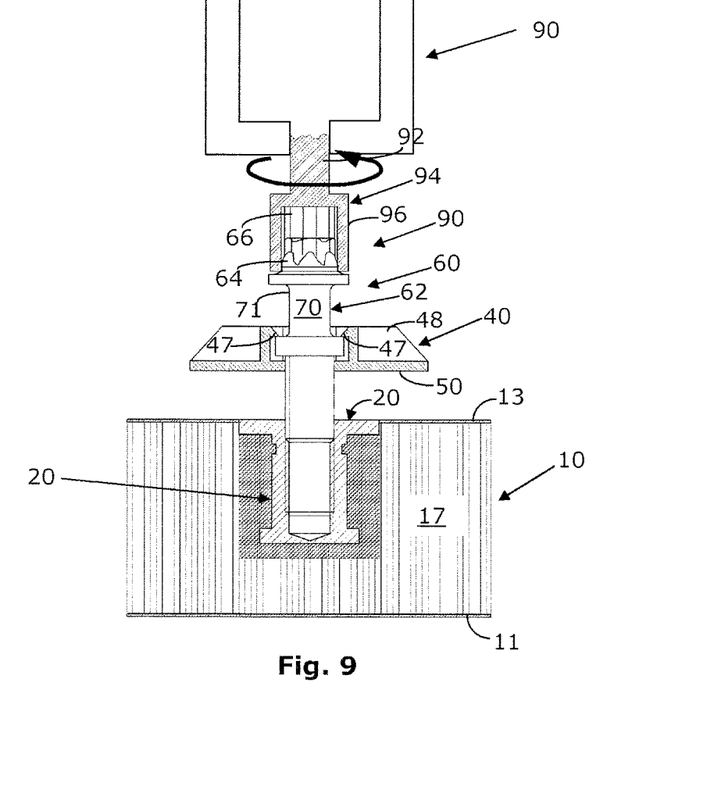
FIG. 9 shows a cross section through the parts shown in FIGS. 2 and 5, a panel product, and an actuating unit during the detachment of the connection between the insert element and the cover and positioning unit by actuating the connecting unit (i.e., the special screw).

After ending the curing operation, as a quality test, a tensile load test is carried out to test the tensile carrying capacity of the insert element 20 anchored in the recess 12, as indicated in FIG. 8. Subsequently, by actuating the connecting unit 60, the connection between the cover and positioning unit 40, 140 and the insert element 20 is detached. The unit 40 and the connecting unit 60 are guided away, and the insert element 20, which is inserted into the recess 12 and fixed therein by means of the filling fluid 15, remains in the recess 12, as shown in FIG. 9.

A panel precursor product 11 is not necessarily flat over its entire surface extension. It can also have curved sections and can also be a panel part which is shaped over its entire surface extension for special applications, which also has attachment regions or buckled regions depending on the application, which can be connected to other panel products or parts of a spacecraft or aircraft for installation and use. A panel precursor product 11 generally comprises not only one, but rather two or also multiple recesses 12, into each of which the insert elements 20 are to be inserted to finish the panel product 10.

A panel precursor product 11 or a panel product 10 is to be understood herein as a component which is constructed in light construction, which is constructed at least sectionally as a plane-parallel wall having cover layers provided on both wall sides (panel surfaces 13), and is implemented at least partially having recesses 12 introduced into the cover layers. A base material 17 is provided between the two cover layers, which consists of a plurality of framework elements 18, for example, parallel strut surfaces or strut webs, or, however, usually of a plurality of hexagonal honeycomb elements.

Figure 10:
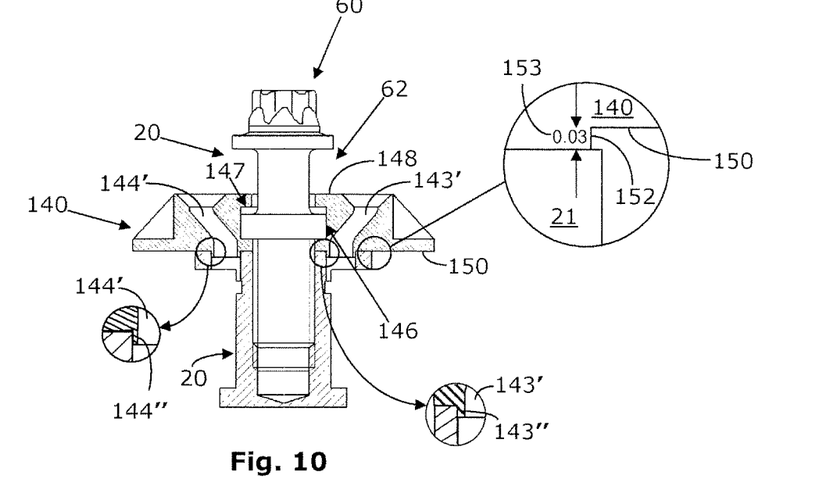
FIG. 10 shows a cross section of a second embodiment of a cover and positioning unit having an insert element, which is fastened thereon by means of a connecting unit, for use in the method or system according to the invention and in section through the horizontal line of symmetry in FIG. 11.
Figure 12:
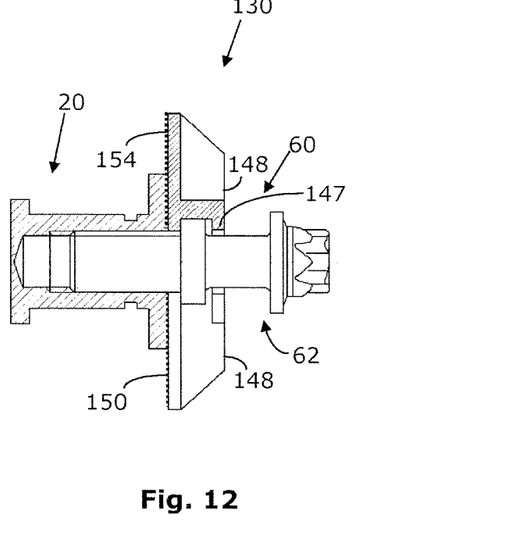
FIG. 12 shows another cross section of the parts shown in FIG. 10, in section through the vertical line of symmetry in FIG. 11.

In the second exemplary embodiment of the invention shown in FIGS. 10 to 12, the insert element 20 and the connecting element 60 or the special screw 62 can be implemented in the same manner as in the first exemplary embodiment. The second exemplary embodiment differs from the first exemplary embodiment due to the special design of the cover and positioning unit 140 described hereafter.

The cover and positioning unit 140 has on its lower side 150 channel extensions 143" and 144", which are implemented around openings implemented thereon (decanting opening 143 and outlet opening 144), as can be seen in the two corresponding detail images of FIG. 10. Thus, the decanting channel extension 143", which encloses the outlet of the decanting channel 143' is implemented around the decanting opening 143 of the unit 140 on the lower side 150, this extension protruding downward from the lower side 150 in FIG. 10, i.e., in the direction toward the insert element 20 to be applied from the lower side 150. When the insert element 20 is preinstalled on the lower side 150 of the insert element 140, the channel extension 143" protrudes into the corresponding through hole 23 in the upper flange 21. Correspondingly, an outlet channel extension 144" is implemented around the outlet opening 144 on the lower side 150 of the unit 140, this extension extending the outlet channel 144' downward in FIG. 10 and protruding into the corresponding other through hole 23 in the upper flange 21 of the insert element 20. The decanting channel extension 143" and the outlet channel extension 144" are used to detach the cover and positioning unit 140 more easily from the inserted insert element 20, which is fixed in the recess, in particular to achieve better tear-off of the cured filling fluid 15 after or during the removal (cf. FIG. 9). Of course, channel extensions (not shown), which are implemented similarly to the channel extensions 143" and 144" of the unit 140 according to the second embodiment as shown in FIG. 10, can also be provided in the cover and positioning unit 40 according to the first exemplary embodiment on its lower side 50.

In summary of the first and second exemplary embodiments illustrated above with reference to FIGS. 1 to 12, the system according to the invention comprises a special screw 62, which can be produced from commercially-available steel or also from titanium and has a screw collar 74, as well as a cover and positioning unit 40, 140 made of a transparent material, for example, a plastic material such as C-PET or PMMA, and having a decanting opening 43, 143, which is implemented as a decanting channel 43', 143', and an outlet opening 44, 144, which is implemented as an outlet channel 44', 144'. The unit 40, 140 is used as described hereafter for inserting and fixing the insert element 20 and for anchoring said insert element in the recess 12 of the panel precursor product 11 by means of a filling fluid 15, for example, by foam embedding. The insert element 20 to be inserted and fixed is fastened by means of the special screw 62 on the lower side 50, 150 of the cover and positioning unit 40, 140. A pair of barbs 47, which is arranged symmetrically around an opening 46, 146 implemented centrally in the unit 40, 140, locks the screw collar 74 of the special screw 62 in the unit 40, 140 and therefore enables automatic or automated withdrawal of the unit 40 from the insert element 20 during the removal, more precisely after the unscrewing of the unit 40, 140 from the insert element 20.

As a constructive special feature of the cover and positioning unit 40, 140, a middle section 41, 141 of the unit 40 (as shown in the detail views of FIGS. 2 and 10) is set back in relation to the edge section 42, 142 of the unit 40 from the lower side 50, 150 (set back downward in FIGS. 2 and 10), and a projection 52, 152 having a predetermined projection height 53, approximately 0.03 mm, is implemented. Due to the projection 52, 152 of the middle section 41, 141, the insert element 20 is arranged deeper in the recess in the preinstalled state, i.e., in the state connected to the unit 40, 140, by the projection height 53, 153 than in comparison to the panel surface 13. It is thus ensured that the insert element 20 does not protrude out of the panel surface 13.

In the two described exemplary embodiments—the first according to FIGS. 1 to 9 and the second according to FIGS. 10 to 12—the special screw 62 has a central marking 68 (see FIGS. 3 and 11) on its screw head 64 on a surface of the hexalobular external, which is suitable for a position determination for optical auxiliary units or visual observation. For easy and optimum interaction with an automatic screwing unit, the special screw 62 is implemented having a hexalobular external 66 on its screw head 64. However, other head shapes are also known to a person skilled in the art, which enable interaction, which can be automated relatively easily, of the screw head with automatic screwing units.

If necessary, a weakly adhering adhesive film 54, 154 can be applied to the lower side 50, 150 of the cover and positioning unit 40, 140, to prevent slipping of the unit 40, 140 or the insert element 20 connected thereon during the decanting of the filling fluid 15 into the intermediate space 16 of the recess 12 or during the handling of the panel precursor products 11 during the curing of the filling fluid.

The mechanical interfaces of the cover and positioning unit 40, 140, in particular its thickness (the spacing of its upper side 48, 148 to its lower side 50, 150), the positions of the decanting opening 43, 143 and the outlet opening 44, 144, the design (shape) of the decanting opening 43, 143 on the upper side 48, 148 (required for the guiding thereto of the metering robot 102 (for example, a foam dispenser) or the seal with its outlet opening 106) for automatically supplying the filling fluid 15 into and through the unit 40, 140, and the shape and design of the outlet opening 44, 144 on the upper side 48, 148 with the light barrier unit 122 to be attached thereon are to be specified precisely for automation. Furthermore, the screw thread 78 of the screw 62 is standardized to or adapted to the standard dimensions M4, M5, and M6 of the threaded borehole 29, which are typical in the commercially-available insert elements 20. The shape of the screw head 64 of the screw 62 is standardized to avoid frequent tool changes (changing of the tool 94 or the actuating unit 92 for the special screw 62) during the installation and removal, i.e., the screwing processes (see FIG. 8). The design of the grip section 70 or of the screw neck 71 of the screw 62 is also standardized for the design of the claimed system for the mechanical tensile test or load test (application of the testing tensile force 118 as illustrated in FIG. 8).

In the second exemplary embodiment of FIGS. 10 to 12, the cover and positioning unit 140 has a lateral notch 146, which extends through the edge section 142 into the middle section 141 and which contains the center of the unit. The special screw 62 can thus be introduced laterally into the cover and positioning unit 140 easily, as is apparent from FIG. 11. Furthermore, the decanting channel 143' and the outlet channel 144' comprise respective channel extensions 143" and 144" (see detail drawings of FIG. 10), which protrude in the preinstalled state into the corresponding through holes 23 in the flange 21 of the insert element 20. A better tear-off of the filling fluid 15 (for example, the foam) during the removal of the unit 140 (cf. FIG. 9) is thus achieved.

An exemplary method according to the invention for producing the panel product 10 will also be described in detail hereafter.

For installing the composite element comprising the insert element 20, the unit 40, 140, and the connecting element 60 (special screw 62), one or a plurality of insert elements 20 are arranged in a magazine and prepared for automatic further processing. Subsequently, the cover and positioning unit 40, 140 is aligned by means of the indentations 49, 149 (see FIGS. 1 and 11) in relation to the insert element 20 so that the inlet channel 43', 143' and the outlet channel 44', 144' of the unit 40, 140 align with the corresponding through holes 23 in the upper flange 21 of the insert element 20. The special screw 62 is then manually or automatically screwed into the threaded borehole 29 of the insert element 20 so that the screw collar 74 of the special screw 62 presses the unit 40, 140 against the insert element 20, wherein the lower side 50, 150 of the unit 40 rests on the upper surface 22 of the upper flange 21 of the insert element 20. The corresponding contact pressure force is selected with the aid of a tightening torque of the special screw 62 so that later slipping of the insert element 20 in relation to the unit 40, 140 during the further method is prevented. During the screwing in, the screw collar 74 presses, with its lower stop face 76, the two barbs 47, 147, which are arranged on both sides of the opening 46, 146 of the unit 40, 140, elastically to the side and the barbs spring back as soon as the screw collar 74 has passed the barbs 47, 147.

To insert and position the insert element 20 in the recess 12 of the panel precursor product 11, the composite element (comprising the insert element 20) is guided, as illustrated in FIG. 6, by means of an automatically activated first arm unit 80 (for example, a first robot arm) having a first connection gripping unit 82, to the recess 12 and positioned until the lower side 50 of the unit 40 rests on the panel surface 13, wherein the insert element 20 is inserted into the recess 12 and positioned in its provided position. The first connection gripping unit 82 of the first arm unit 80 then fixes the composite element during the decanting of the filling fluid 15. Alternatively or additionally, a weakly adhering adhesive film 54, 154, which is applied to the lower side 50, 150 of the unit 40, 140, fixes the unit 40, 140 on the panel surface 13 by adhesive mediation with the panel surface 13 in the region around the recess 12.

To decant the filling fluid 15 into the intermediate space 12 between the delimitation 14 of the recess 12 and the insert element 20 positioned in the recess 12, by means of a third arm unit 100, the metering robot 102 (for example, a foam dispenser) is moved into position, i.e., into engagement with the inlet opening 43 of the unit 40, as shown in FIG. 7. Furthermore, the sensor unit 120, for example, a light barrier unit 122 for monitoring the outlet opening 44 and detecting the exit of filling fluid from the outlet opening 44 is moved into position or operational readiness at the outlet opening 44. The metering robot 102 is pressed against the inlet opening 43, wherein the outlet opening 46 engages in the decanting opening 43 and seals thereon. The intermediate space 16 in the recess 12 of the panel precursor product 11 is then filled, through the inlet channel 43' and the corresponding through hole 23 in the flange 21 of the insert element 20, with the filling fluid which is curing or to be cured (for example, the self-curing foam). When the intermediate space 16 is completely filled with filling fluid, the filling fluid rises through the outlet channel 44' into the unit 40. At the outlet opening 44, the light barrier unit 122 is located, which monitors the light transmissivity of the outlet channel 44' through the transparent unit 40. When the filling fluid in the outlet channel 44' reaches the position of the light barrier unit 122, the light transmissivity is changed, the light barrier unit 122 is activated, the output signal is output, and the filling procedure is stopped because of the change of the output signal. The metering robot 122 is subsequently automatically guided away further by means of the third arm unit.

As a quality control and to ensure a predetermined tensile carrying capacity, after the complete curing of the decanted filling fluid, as illustrated in FIG. 8, a loading tensile test is carried out on the insert element, which is introduced into the recess 12 and anchored by the cured filling fluid 15. For this purpose, a fourth arm unit 110 having a second connection gripping unit 112 is moved into a position above the composite element having the insert element 20. The second connection gripping unit 112 grasps the special screw 62 at the grip section 70 (the screw neck 71 below the screw head 64) and applies the testing tensile force 118 in the direction indicated by the arrow 119 (see FIG. 8) perpendicular to the panel surface 13 via the special screw 62 to the insert element 20.

If it is required to verify specific precision demands or guarantees, after the tensile test, in the state illustrated in FIG. 8, the precise geometrical location of the axis of rotational symmetry of the insert element 20 can also be ascertained. For this purpose, with the aid of an optical measuring method, the position of the central marking 68 or the positions of the other markings 68 provided on a circular circumference of the screw head 64 are determined and analyzed.

To remove the composite element, the special screw 62, as illustrated in FIG. 9, is unscrewed, either manually or with the aid of a fully automatic screwing unit 90, 94, from the insert element 20. During the unscrewing of the special screw 62, the screw collar 74 comes into contact with the barbs 47 of the unit 40 and thus draws the unit 40 away from the panel surface 13 in the direction of the arrow 119 (see FIG. 8). In this case, the cured filling fluid 15 in the through holes 23 of the upper flange 21 of the insert element 20 is separated from the filling fluid residues in the decanting channel 43', 143' and in the outlet channel 44', 144', optionally better defined by the channel extensions 143" and 144".

To check the quality of the thread of the threaded borehole 29 in the insert element 20, during the removal procedure (during the unscrewing of the special screw 62), the torque is measured and the time curve thereof is recorded. After the special screw 62 is unscrewed and the unit 40 is removed, the insert element 20 remains back in the recess 12, anchored by the cured filling fluid 15.

After completed removal, the special screw 62 can be removed from the used sealing and positioning unit 40 by opening or breaking off the barbs 47 and can be reused for introducing or installing further insert elements 20 in further recesses 12 of the panel product.

INDUSTRIAL APPLICABILITY

The installing of insert elements 20 in recesses 12 of panel precursor products 11 can be carried out automatically by the method according to the invention and by means of the system according to the invention. The insert elements 20 have heretofore been inserted manually into the recesses 12 and embedded in foam, which is intensive in work, time, and cost.

It is ensured by the automatic detection of the exit of the filling fluid from the outlet opening during the installation of an insert element 20 that an insert element 20, in an automated process, can be correctly positioned in a panel precursor product (light construction panel) 11, completely filled with filling fluid, and verified using a test load.

The decanting channels 43', 143', which are provided in the unit 40, 140, enable automatic and complete decanting of the self-curing filling fluid through a through hole 23 of the insert element into the intermediate space 16 of the recess 12 of the panel precursor product 11. The sensor unit 120 provided at the outlet channel 44', 144', for example, the optical light barrier unit 122, detects the exit of the filling fluid through the transparent sealing and positioning unit 40, 144 and triggers the ending of the filling fluid supply in this case. This prevents soiling or contamination of the panel product 11 and of the tools 62, 40, 140, 94, 80, 102, 110, and 90, which are used in the course of the method, because of the exit of possible excess filling fluid (foam).

The grip section 70 (screw neck 71) of the connecting unit 60 (the special screw 62) provides a mechanical interface for an automatic application of a test load by means of a connection determination unit 112 in an automated form.

Due to the design of the connecting unit 60 as a special screw 64, for example, having a screw head 64, which simplifies the automation, having a hexalobular external 66 and a standardized screw thread 78, it is made possible that the special screw 62 can be screwed automatically using a suitable tool 94 (of a hexalobular external screwdriver 96) in a completely or partially automated process into the threaded borehole 29 of the insert element 20 and can also be unscrewed again.

Due to the interplay disclosed in the description between the sealing and positioning unit 40, 140 and the special screw 62, during the unscrewing of the screw 62 (during the removal of the composite element), the unit 40, 140 is itself also automatically removed itself from the inserted insert element 20 and a clean separation of the filling fluid (foam) residues in or at the unit 40, 140 from the cured filling fluid in (the through holes 23) of the insert is caused.

If the torque is ascertained (the time curve of the torque is recorded) during the unscrewing of the special screw 62, the thread quality of the threaded borehole 29 in the insert element 20 can also be verified during the unscrewing of the special screw in a completely or partially automated process.

Because the special screw 62 is reusable, at least some of the connecting units 60 (screws 62) required for the automated installation of the insert element 20 in the recess 12 can be reused after use.

Due to the design embodiment or geometrical shaping of the insert element 20, the sealing and positioning unit 40, 140, and the special screw 62, they can automatically be preassembled as a composite element in a completely or partially automated process with the aid of a screwing machine and also can be disassembled again.

If, during the screwing in or detachment of the screw 62 from the pinched middle section of the threaded borehole 29 (at the notch 24) of the insert element 20, the torque required for this purpose is automatically measured, a measure is obtained of the securing quality of a fastening element screwed into the threaded borehole 29 of the insert element 20 in weightlessness, for example, in a spacecraft.

Due to the central marking 68 on the screw head 64 or the one or more markings 69 of the special screw, which are provided on a circle on the circumference of the screw head 64 and can be differentiated from one another, a visual verification of the geometrical position of the insert element 20 or the rotational angle position of the screw 62 using optical or visual methods is possible in a completely or partially automated process.

Although the invention above has been described in connection with preferred embodiments of the invention, it will be evident for a person skilled in the art that several modifications are conceivable without departing from the invention as defined by the following claims.

What is claimed is:

1. A system for producing a panel product device, in which a panel precursor product is provided, having at least one recess, which is implemented in a panel surface having a delimitation, and at least one insert element, which is provided for anchoring in at least one of the recesses, said system comprising:
   means for automated insertion of the insert element into the recess of the panel precursor product, said insertion means comprising a sealing and positioning unit, and
   means for automated filling of an intermediate space between the insert element and the delimitation of the recess with a curable or curing filling fluid, said automated filling means comprising the sealing and positioning unit having a decanting opening for decanting the filling fluid into the intermediate space and an outlet opening for discharging excess filling fluid from the intermediate space, and
   wherein the sealing and positioning unit is implemented so that when it rests on the panel surface, a fluid-tight seal with respect to the filling fluid is implemented between the panel surface and the sealing and positioning unit such that an exit of the filling fluid from the intermediate space is prevented during the filling and a barrier or counter pressure with respect to the exit of the decanted filling fluid is also provided.

2. The system according to claim 1, wherein the filling fluid decanted into the intermediate space is a curable fluid.

3. The system according to claim 1, wherein the sealing and positioning unit has a lower side and is implemented so that the insert element can be detachably fastened on the lower side.

4. The system according to claim 1, wherein the decanting opening is implemented in the sealing and positioning unit at a decanting position, which is selected so that the decanting opening is in fluid communication with a first partial spatial region of the intermediate space when the sealing and positioning unit rests on the panel surface,
   the outlet opening is implemented in the sealing and positioning unit at an outlet position, which is selected so that the outlet opening is in fluid communication with a second partial spatial region of the intermediate space when the sealing and positioning unit rests on the panel surface, and
   wherein the second partial spatial region is in fluid communication with the first partial spatial region with fluid paths through the intermediate space, wherein the fluid paths substantially reach all partial spatial regions of the intermediate space which are complementary to the first and second partial spatial regions.

5. The system according claim 1, wherein the sealing and positioning unit comprises a middle section, on a lower side of which the insert element can be detachably fastened, and an edge section enclosing the middle section, in which the decanting opening and the outlet opening are implemented.

6. The system according to claim 5, wherein the middle section of the sealing and positioning unit is arranged between the decanting opening and the outlet opening.

7. The system according to claim 5, wherein the middle section protrudes, from a lower side of the sealing and positioning unit, in relation to the edge section by a predetermined projection height.

8. The system according to claim 1, comprising a connecting unit for the detachable connection of the sealing and positioning unit to the insert element.

9. The system according to claim 8, wherein the connecting unit is actuable to connect the sealing and positioning unit to and to detach the sealing and positioning unit from the insert element.

10. The system according to claim 8, wherein the connecting unit has a grip section which is implemented so that it can be detachably grasped by a connection gripping unit.

11. The system according to claim 8, wherein the insertion means further comprise the connecting unit, and a first gripping unit, which comprises a connection gripping unit, wherein the connection gripping unit is implemented and is activatable via a first arm unit so that it can grasp, move, position in a predetermined position, and release a composite group, which is implemented from the sealing and positioning unit, the connecting unit, and the insert element detachably fastened on the connecting unit.

12. The system according to claim 8, comprising a second arm unit having an actuating unit for actuating the connecting unit,
wherein the actuating unit is implemented so that it can interact with the connecting unit,
wherein the actuating unit is implemented and is activatable via the second arm unit so that it can actuate the connecting unit to connect the sealing and positioning unit to and to detach the sealing and positioning unit from the insert element.

13. The system according to claim 12, wherein the actuating unit of the second arm unit is a tool.

14. The system according to claim 1, wherein the filling means furthermore comprise an activatable and positionable metering robot having a fluid storage container for storing a predetermined storage quantity of the filling fluid and an outlet opening for discharging filling fluid,
and further comprising a metering unit, which is activatable using a control signal, for starting and ending the discharge of the filling fluid from the metering robot.

15. The system according to claim 14, wherein the filling means furthermore comprise a third arm unit,
wherein the third arm unit is implemented and activatable so that it can move the metering robot and position it in a predetermined position.

16. The system according to claim 14, further comprising means for presetting a predetermined quantity of the filling fluid to be discharged from the outlet opening of the metering robot,
wherein the presetting means comprise means for measuring a decanting duration and/or means for monitoring a mass or weight increase of the panel product due to the decanted filling fluid.

17. The system according to claim 1, wherein a sensor unit for monitoring the outlet opening is provided in the sealing and positioning unit, and
wherein the sensor unit is implemented to output a signal when filling fluid passes through the outlet opening.

18. The system according to claim 17, wherein a control signal input of a metering unit is in electrical communication with the signal output by the sensor unit.

19. The system according to claim 1, comprising means for automatically checking a load-bearing capacity of a connection between the insert element and the recess,
wherein the means for automatically checking a load-bearing capacity comprise a fourth arm unit having a second connection gripping unit for grasping a connecting unit,
wherein the second connection gripping unit is implemented so that it can be detachably connected to the connecting unit, and
wherein the second connection gripping unit is implemented and is activatable via the fourth arm unit, so that it can grasp, hold, and apply a variable testing tensile force up to a predetermined testing tensile force to the connecting unit, and release the connecting unit.

20. The system according to claim 19, wherein the second connecting gripping unit is implemented so that it can be detachably connected to a grip section of the connecting unit, and
wherein the second connecting gripping unit can grasp, hold, and apply a variable testing tensile force up to a predetermined testing tensile force to the insert element, and release from the grip section of the connecting unit.

21. The system according to claim 1, wherein the sealing and positioning unit further comprises a barrier with respect to the exit of decanted filling fluid.

* * * * *